US007415454B2

(12) United States Patent
Yan (10) Patent No.: US 7,415,454 B2
(45) Date of Patent: Aug. 19, 2008

(54) ALLOCATION PERFORMANCE BY QUERY OPTIMIZATION

(75) Inventor: Peiyuan Yan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 11/282,363

(22) Filed: Nov. 18, 2005

(65) Prior Publication Data

US 2007/0118501 A1    May 24, 2007

(51) Int. Cl.
*G06F 17/30* (2006.01)
(52) U.S. Cl. .............................. 707/2; 707/205; 707/206
(58) Field of Classification Search ........................ None
See application file for complete search history.

(56) References Cited

U.S. PATENT DOCUMENTS

| | | | | |
|---|---|---|---|---|
| 5,822,747 | A | 10/1998 | Graefe et al. | 707/2 |
| 5,864,841 | A | 1/1999 | Agrawal et al. | 707/2 |
| 6,134,540 | A | 10/2000 | Carey et al. | 707/2 |
| 6,205,441 | B1 | 3/2001 | Al-omari et al. | 707/2 |
| 6,226,637 | B1 | 5/2001 | Carey et al. | 707/4 |
| 6,263,345 | B1 * | 7/2001 | Farrar et al. | 707/104.1 |
| 6,289,334 | B1 * | 9/2001 | Reiner et al. | 707/3 |
| 6,363,377 | B1 | 3/2002 | Kravets et al. | 707/2 |
| 6,546,395 | B1 * | 4/2003 | DeKimpe et al. | 707/101 |
| 6,651,055 | B1 * | 11/2003 | Kilmer et al. | 707/3 |
| 6,665,664 | B2 | 12/2003 | Paulley et al. | 707/4 |
| 6,823,329 | B2 * | 11/2004 | Kirk et al. | 707/2 |
| 6,834,278 | B2 * | 12/2004 | Yu et al. | 707/2 |
| 7,089,266 | B2 * | 8/2006 | Stolte et al. | 707/104.1 |
| 2004/0039729 | A1 * | 2/2004 | Boger et al. | 707/2 |
| 2004/0064449 | A1 | 4/2004 | Ripley et al. | 707/5 |
| 2004/0139061 | A1 * | 7/2004 | Colossi et al. | 707/3 |
| 2005/0010565 | A1 * | 1/2005 | Cushing et al. | 707/3 |
| 2005/0154725 | A1 | 7/2005 | Day et al. | 707/5 |
| 2005/0160100 | A1 | 7/2005 | Eikenhorst et al. | 707/100 |

FOREIGN PATENT DOCUMENTS

WO    WO 01/44987 A2    6/2001

OTHER PUBLICATIONS

Zaman, Kazi A, et al., "Modeling and querying multidimensional data sources in Siebel Analytics: a federated relational system", International Conference on Management of Data Proceedings of the 2005 ACM SIGMOD international conference on Management of data, 2005, pp. 822-827.*
PCT Search Report dated Apr. 4, 2007 cited in Application No. PCT/US2006/044183.
PCT Search Report dated Apr. 17, 2007 cited in Application No. PCT/US2006/046656.
PCT Search Report dated Apr. 20, 2007 cited in Application No. PCT/US2006/045386.
PCT Search Report dated Apr. 26, 2007 cited in Application No. PCT/US2006/046473.

* cited by examiner

*Primary Examiner*—Tim Vo
*Assistant Examiner*—Michelle Owyang
(74) *Attorney, Agent, or Firm*—Merchant & Gould P.C.

(57) ABSTRACT

Allocation performance is enhanced by optimizing queries associated with the allocation. A sparse definition space for a calculation is translated into a dense space for performing the calculation for efficient resource utilization. A calculation expression is symbolically analyzed to determine a relationship between non-zero calculated results and non-zero cells in the input data. From this relationship the regions on which the calculated results are non-zero are obtained by examining the input data. The calculation space is thus reduced to a smaller one. The resulting calculation space is no longer sparse and enables efficient performance of allocation.

17 Claims, 7 Drawing Sheets

Fig. 6 — Example Algorithms

Fig. 7

ALLOCATION PERFORMANCE BY QUERY OPTIMIZATION

BACKGROUND

Data in business applications is often viewed in the form of a spreadsheet. A spreadsheet may be thought of as a "two dimensional" array of data. Each cell in the spreadsheet represents a value of two related entities, or dimensions. For example, one dimension may be time, while a corresponding cross-dimension may be revenue. Many applications, however, may have data, which has more than two dimensions. Business data having more than two dimensions are called multi-dimensional data.

Multi-dimensional data is often used in financial planning, budgeting, and forecasting applications. Examples of common dimensions in such an application include account, time, product, business unit, financial scenarios, and the like. A particular piece of data in such a multi-dimensional data space may be (revenue, February-2005, service, budget, 1000) representing the fact that the data value is 1000 for account=revenue, time=February-2005, business unit=service, and financial scenario=budget.

A common calculation in planning, budgeting, and forecasting applications is to set a high-level goal and then break it down to lower level goals that support the high-level goal. This type of calculation is called allocation. For example, one can set the all-year-2004 revenue goal as $10 million for business unit=service, and financial scenario=budget. This goal can then be broken down to revenue goals for each of the 12 months in 2004. One approach for performing an allocation is to represent the multi-dimensional data in an OLAP (online analytical processing) model such as Microsoft SQL Server Analysis Service® cube, generate Multi-Dimensional eXpression (MDX) query for the allocation, and then execute the query in the Microsoft SQL Server Analysis Service engine.

SQL Server Analysis Service engine may perform poorly for sparse calculations—a calculation is called sparse, if the number of data points need to be calculated is large but most of calculated results are actually zero. The MDX queries generated for allocations tend to be sparse for many of business applications. Therefore, a brute force execution of these queries on an SQL Server Analysis Service engine may result in poor performance.

SUMMARY

Allocation performance is enhanced by optimizing queries associated with the allocation. A calculation expression is symbolically analyzed to establish a relationship between non-zero calculated results and non-zero data rows in the input data. Non-zero regions of the calculated results can thereby be determined from the non-zero regions of the input data, enabling a reduction of the calculation complexity by eliminating the zero regions from the calculation symbolically. The calculation thus simplified is usually no longer sparse.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

According to embodiments, a method for establishing a relationship between the non-zero regions of calculated results and non-zero regions of input data is provided. Using this relationship, non-zero regions of the calculated results may be determined from the non-zero regions of the input data, thereby reducing the calculation complexity by eliminating the zero regions from the calculation symbolically.

The relationship may be established employing following three steps. First, the calculation expression is examined to determine whether each term in the expression is dominated by at least one tuple expression. A cell is a point in a multi-dimensional space with every coordinate fully specified, and a tuple is a list of partial coordinates of the cell. A tuple expression is an expression representing a tuple. A term is dominated by a tuple expression, if the term becomes zero when the tuple expression becomes zero.

Next, for each tuple expression in the calculation, all dimensions explicitly mentioned in the tuple expression are found. Dimensions not explicitly mentioned in a tuple expression must have the same values as the target cell—the cell to be calculated.

Then, from the above two steps one may conclude that a target cell is non-zero only if at least one of the input data cell is non-zero, and this input data cell has the same values along the dimensions not explicitly mentioned in any of the tuple expressions. This establishes the relationship between the non-zero calculated results and the non-zero input data.

Illustrative Operating Environment

Figure 1:
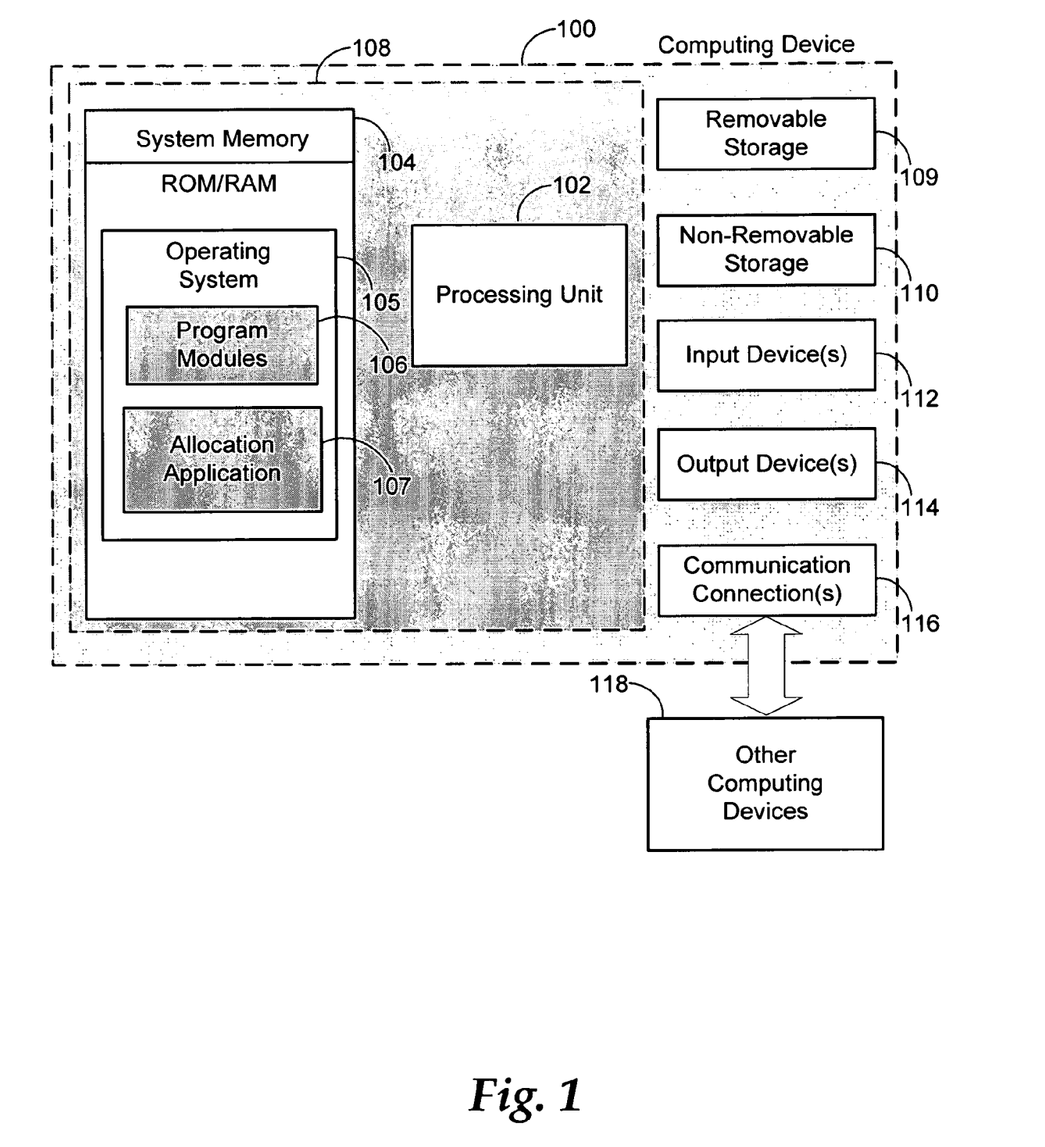
FIG. 1 illustrates a computing device in which an application for allocation may be executed using query optimization for performance enhancement.

Referring to FIG. 1, an exemplary system for implementing some embodiments includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes operating system 105 and one or more program modules 106 working within operating system 105.

In addition to program modules 106, allocation application 107 may also be executed within operating system 105. Allocation application 107 may be a business application performing calculations on multi-dimensional data to analyze and report on status, goals, progress, financial analysis, and the like. In case of a sparse definition space for its calculations, allocation application 107 may translate the definition space into a dense space and perform the calculations for efficient resource utilization.

Figure 2:
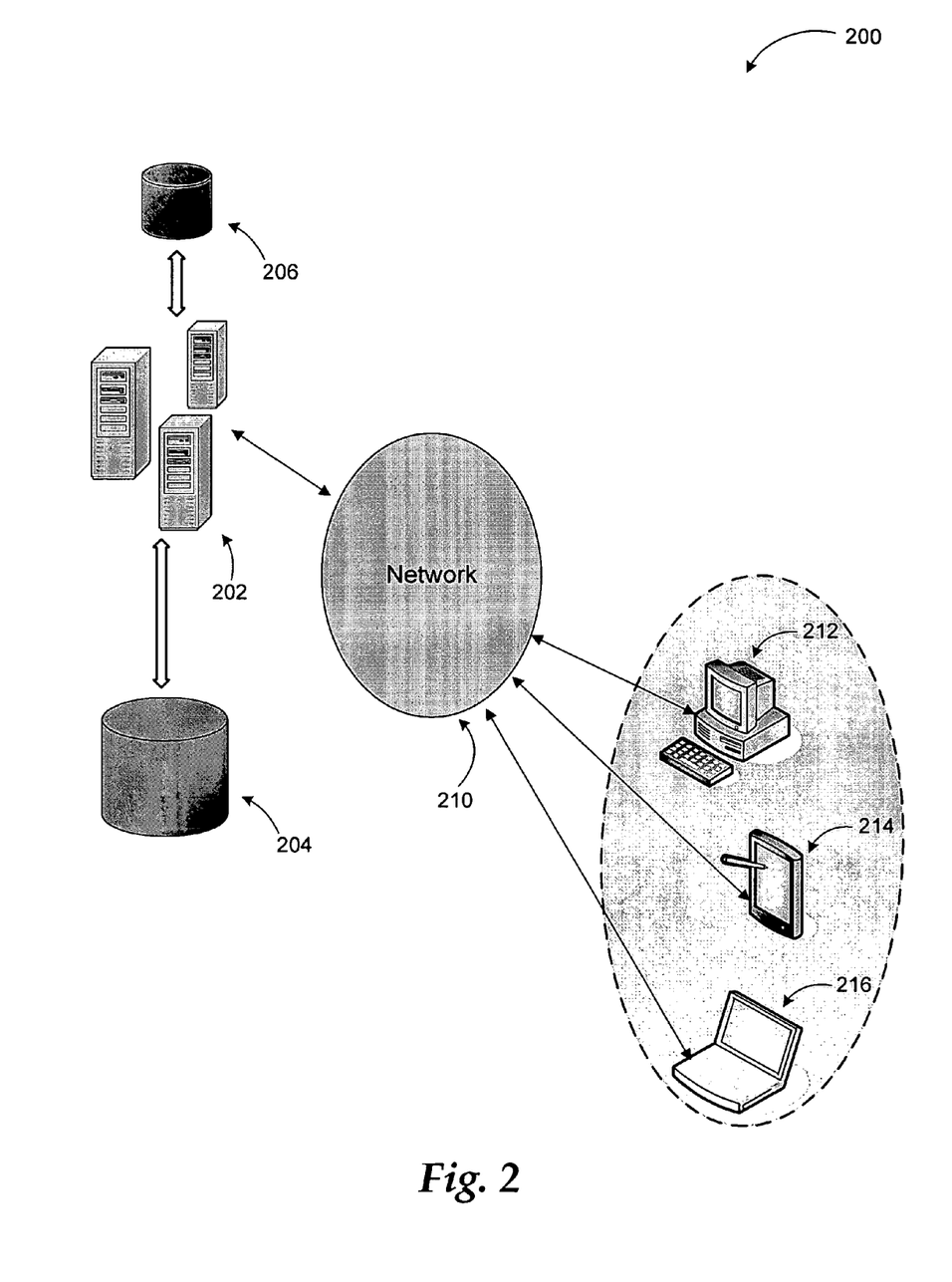
FIG. 2 illustrates an example system, where aspects of an allocation application may be implemented.

To perform the actions described above, allocation application 107 may include and/or interact with other computing devices and applications and application interfaces (APIs) residing in other applications such as the databases shown in FIG. 2.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data.

System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as retail devices, keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

FIG. 2 illustrates example system 200, where aspects of an allocation application may be implemented. System 200 may include one or more networks that comprise any topology of servers, clients, Internet service providers, and communication media. The networks may also have a static or dynamic topology.

An allocation application, such as allocation application 107 of FIG. 1, may reside on server(s) 202. In one embodiment, the application may be run across distributed servers, mainframe computers, and the like. Server(s) 202 may include a number of other applications such as accounting applications, database applications, communication applications, and the like.

In another embodiment, server(s) 202 may interact with database 204 that is arranged to store data for business applications. The allocation application may perform an optimized query before performing allocation calculations reducing the calculation space significantly from the relatively large definition space. Data in the reduced calculation space may be stored (temporarily) in database 206. In another embodiment, calculation results may also be stored in database 204 or 206.

The allocation application may interact with client devices, such as handheld computer 214, desktop computer 212, and laptop computer 216, over network 210 to receive instructions such as the expression for the calculation, provide reports, and perform other allocation related tasks. Client devices communicating with server(s) 202 may include any type of computing device, not limited to the examples shown herein.

Network 210 may be a secure network such an enterprise network, or an unsecure network such as a wireless open network. Network 210 provides communication between the nodes described above. By way of example, and not limitation, network 210 may include wired media such as a wired network or direct-wired connection, and wireless media such as acoustic, RF, infrared and other wireless media.

The present invention is not limited to the above-described environment, however. Many other configurations of computing devices, communications, applications, and distribution systems may be employed to implement a business application that uses query optimization for allocation performance improvement.

Illustrative Embodiments for Improving Allocation Performance By Query Optimization Embodiments are directed to reducing a sparse calculation to non-sparse, thereby, significantly improving allocation performance. A symbolic analysis of the calculation expression is performed to reduce sparse definition space for the calculation. By analyzing the calculation expression symbolically, regions of zero (or non-interesting) values are determined without actually performing the calculation for the whole space.

For example, a company may set aside a total special advertising budget of $1 million for the current year, which needs to be split by month, by store, and by product based on the same percentage spent in the previous year. If the calculation assumes 12 months, 100 stores, and 10,000 products, a space of 12*100*10,000=12 million is the definition space for the calculation. However, for a majority of the months, stores, and products no advertising funds may have been spent in the previous year. The special advertising funds may have been spent only during a few months of the year at selected stores for a select few products. Accordingly, the actual allocation is a small list of (month, store, product) combinations. This is a typical sparse calculation. By analyzing the formula one can recognize that the calculation produces non-zero result only if the previous year's spending was non-zero, which can be easily determined by retrieving the actual spending records of the previous year. Using the list of the previous year's spending and the realization that the current year's spending is non-zero only if the previous year's value is non-zero, the calculation can be reduced to those combinations that have a no-zero value from the previous year, thus reducing the allocation significantly.

Figure 3:
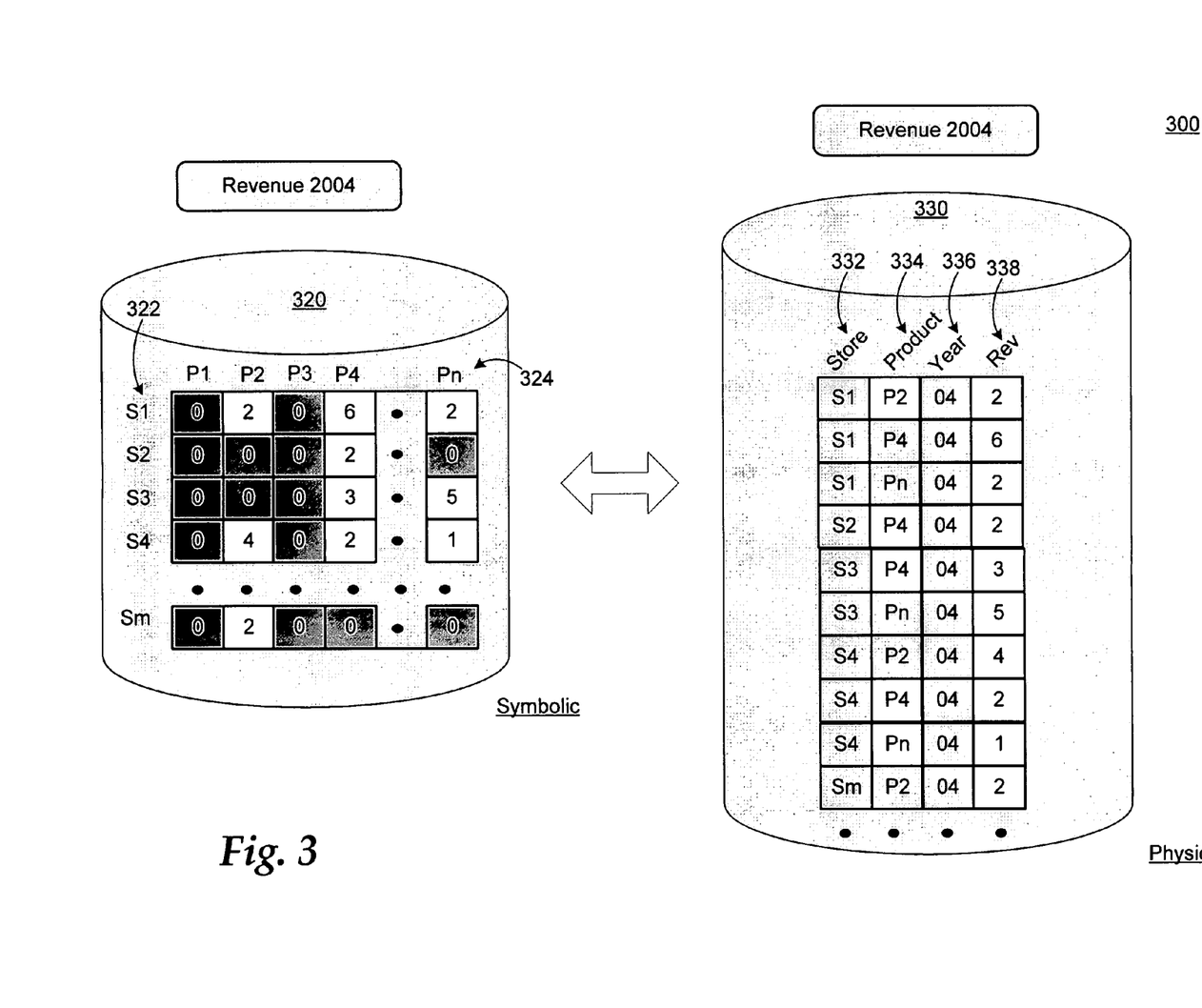
FIG. 3 is a conceptual diagram illustrating symbolic (2-dimensional spreadsheet) and physical (table) representations of example multi-dimensional data.

FIG. 3 is a conceptual diagram illustrating symbolic (2-dimensional spreadsheet) and physical (table) representations of example multi-dimensional data.

Some of the terms in allocation calculations can be defined as follows. As mentioned before, a cell is a point in a multi-dimensional space with every coordinate fully specified. A tuple is a list of partial coordinates of a cell. A non-empty tuple (with respect to a scope S) is a tuple such that there exists an expansion of the tuple to a cell where the cell is in scope S and the cell value is non-empty. The set of all input data is called "fact table" following the terminology used in OnLine Analytical Processing (OLAP).

Embodiments of query optimization for allocation performance improvement may be implemented by identifying "non-empty" tuples of the calculated scope with the non-empty tuples of the fact table. Non-empty tuples of the fact table can be relatively easily obtained by an SQL query in general and by a NonEmptyCrossjoin function in MDX in particular. The NonEmptyCrossjoin function returns the cross product of two or more sets as a set, excluding empty tuples or tuples without data supplied by underlying fact tables. Accordingly, non-empty tuples of the calculated region can also be obtained relatively easily. Once the non-empty tuples of the calculated region are determined, the tuples can be expanded to cells by forming a cross-join with the missing dimensions. The longer the non-empty tuples, the better the optimization because a number of missing dimensions is bound to be small resulting in smaller regions of the cross-join. Following the notation used in MDX, in subsequent descriptions we use the expression "select Non Empty . . ." to mean filtering out zero calculated results at the end of the calculation, and "select (NonEmptyCross Join( . . . ))" to mean filtering out zero calculated results using input-data-to-calculated-results relationship before the calculations are performed.

While MDX notations are used throughout this text, the invention is not limited to SQL expressions, and embodiments may be implemented in other database systems using the principles described herein.

An allocation calculation can be simplistically expressed as a formula of the form:
Scope(SubCube)
Expression
End The sub-cube may be of the form (S1, S2, . . . Sn), where Si is a member set in the i-th dimension and (S1, S2, . . . Sn) is the Cartesian product of the member sets. The size of the calculated space is |S1|*|S2| . . . * |Sn|, where |Si| is the cardinality of the set Si. If a result of the calculation contains only small number of non-zero values, the calculation is called "sparse".

A brut force subroutine for allocation that only eliminates non-zero results at the end may be expressed as:
With cell calculation xxx for
'large-sub-cube'
As
expression
Select non empty (large-sub-cube)
From cube This approach is resource-inefficient since the calculation is performed for the whole space regardless of whether the result is zero, and the zero result is eliminated at the end.

Using NonEmptyCrossjoin, the same calculation can be optimized according to one embodiment as:
With Cell calculation XXX for
'(S1, S2, . . . Sn)'
As
E
Select NonEmpty(Crossjoin(S1, S2, . . . Sm)*NonEmpty-Crossjoin (Sm+1, . . . Sn))

This approach is more resource-efficient because nonEmptyCrossJoin can be performed before the calculation is performed. Hence, the space in which the calculation is to be performed is reduced significantly.

Referring to FIG. 3, revenue 2004 data is shown in data store 320 represented in a two-dimensional spreadsheet format. Rows 322 include one dimension (e.g. stores $S_1$-$S_m$) and columns 324 include another dimension (e.g. products $P_1$-$P_n$). This symbolic representation may take the form of an multi- or single-dimensional data storage.

The same revenue data 2004 is shown in data store 330 in physical data representation format, which is a table format. First dimension stores are listed in column 332. For each store (e.g. $S_1$-$S_m$), corresponding products (e.g. $P_1$-$P_n$) are listed in column 334. Next column 336 includes year, which in this example is 04. Last column 338 includes a listing of revenue values for each combination.

Figure 4:
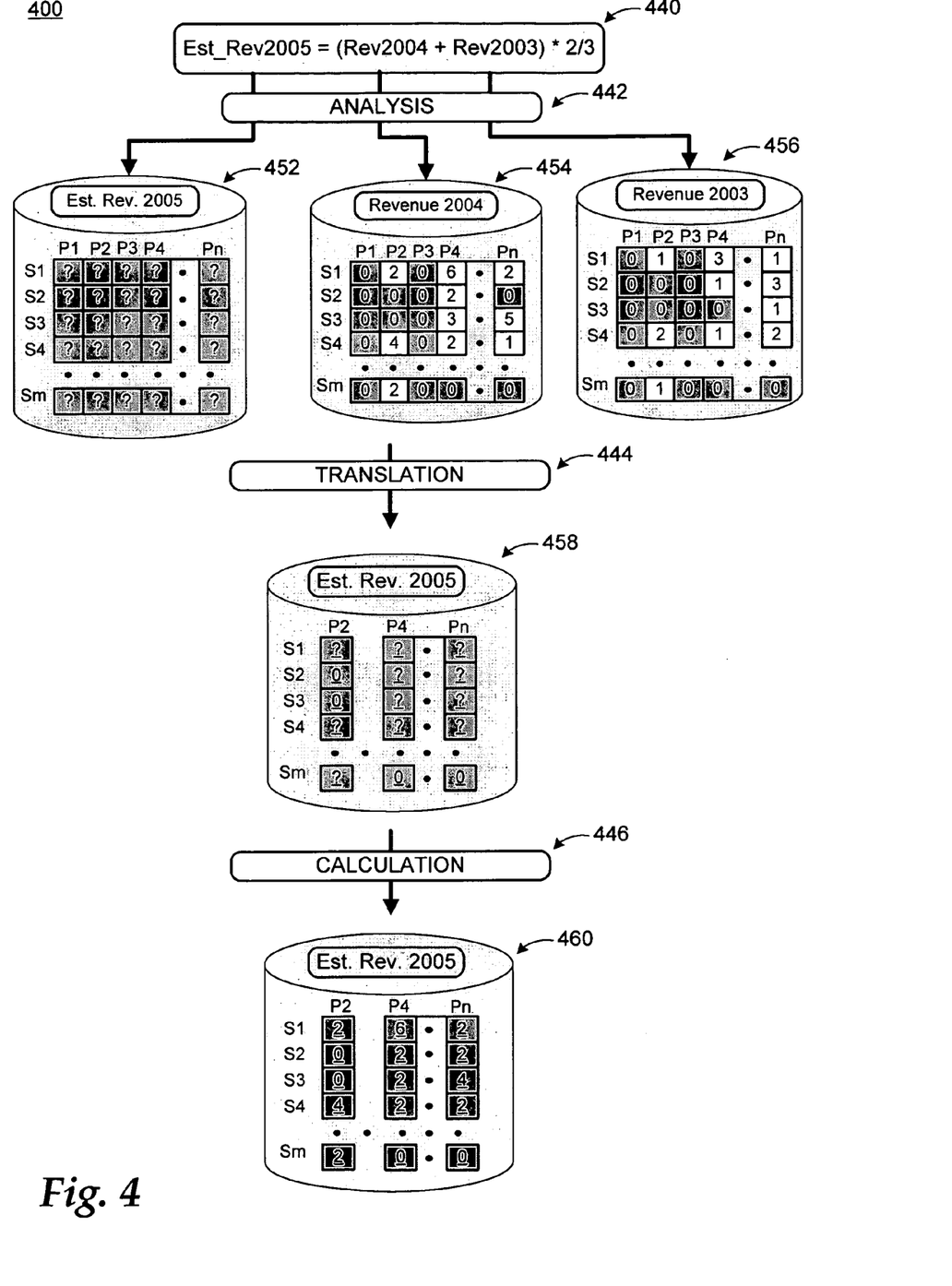
FIG. 4 is a conceptual diagram illustrating an allocation with query optimization emphasizing translation of data from a sparse space to a dense space in a two-dimensional data storage environment.

FIG. 4 is a conceptual diagram illustrating an allocation with query optimization emphasizing translation of data from a sparse space to a dense space in a two-dimensional data storage environment.

The allocation shown in diagram 400 begins with expression 440. Expression 440 defines a relationship to be applied to data in a definition space to derive a result. For example, expression 440 may be for determining estimated budget of a company with multiple stores. The expression maybe defined as $$\text{Est\_Rev}_{2005}=(\text{Rev}_{2004}+\text{Rev}_{2003})*0.5$$

According to some embodiments, optimizing the query begins with a symbolic analysis of expression 440. For the above example, analysis 4420 reveals that dimension of interest for the allocation is revenue, and the data range of interest is years 2003 and 2004. Stores ($S_1$-$S_m$) and products ($P_1$-$P_n$) are two other dimensions used in the illustration and data points in the two dimensional space (store, product) are to be analyzed and reduced in the translation process.

Analysis 442 leads to translation of definition space (typically sparse) to more dense calculation space. The symbolic analysis of the expression may be dynamically adjusted if a dimension or a data range within the expression is modified. A definition space may be any type of data structure including, but not limited to, tables, spreadsheets, multi-dimensional data stores, and the like. Definition space 452 is illustrated as example two dimensional spreadsheet data representation. Terms of expression 440 are also represented in two dimensional spreadsheet data representation.

Columns $P_1$ through $P_n$ represent products, and rows $S_1$ through $S_m$ represent stores, and the number in each cell represents revenue. An illustration of an alternative representation of this data in a database table is given in FIG. 3 above.

Translation 444 is the operation of reducing definition space 452 to calculation space 458. Details of the translation operation are described below, along with an example, in conjunction with FIGS. 6 and 7.

Calculation space 458 includes table representation containing data with empty (non-interesting) values largely reduced. Performing calculation 446 on this space to arrive at results data space 460 reduces resource usage (memory, processing time, etc.) significantly increasing an overall efficiency of the allocation application.

The invention is not limited to the example data structures or operations described in conjunction with FIGS. 3 and 4. Other data structures and operations may be implemented using the principles described herein.

Figure 5:
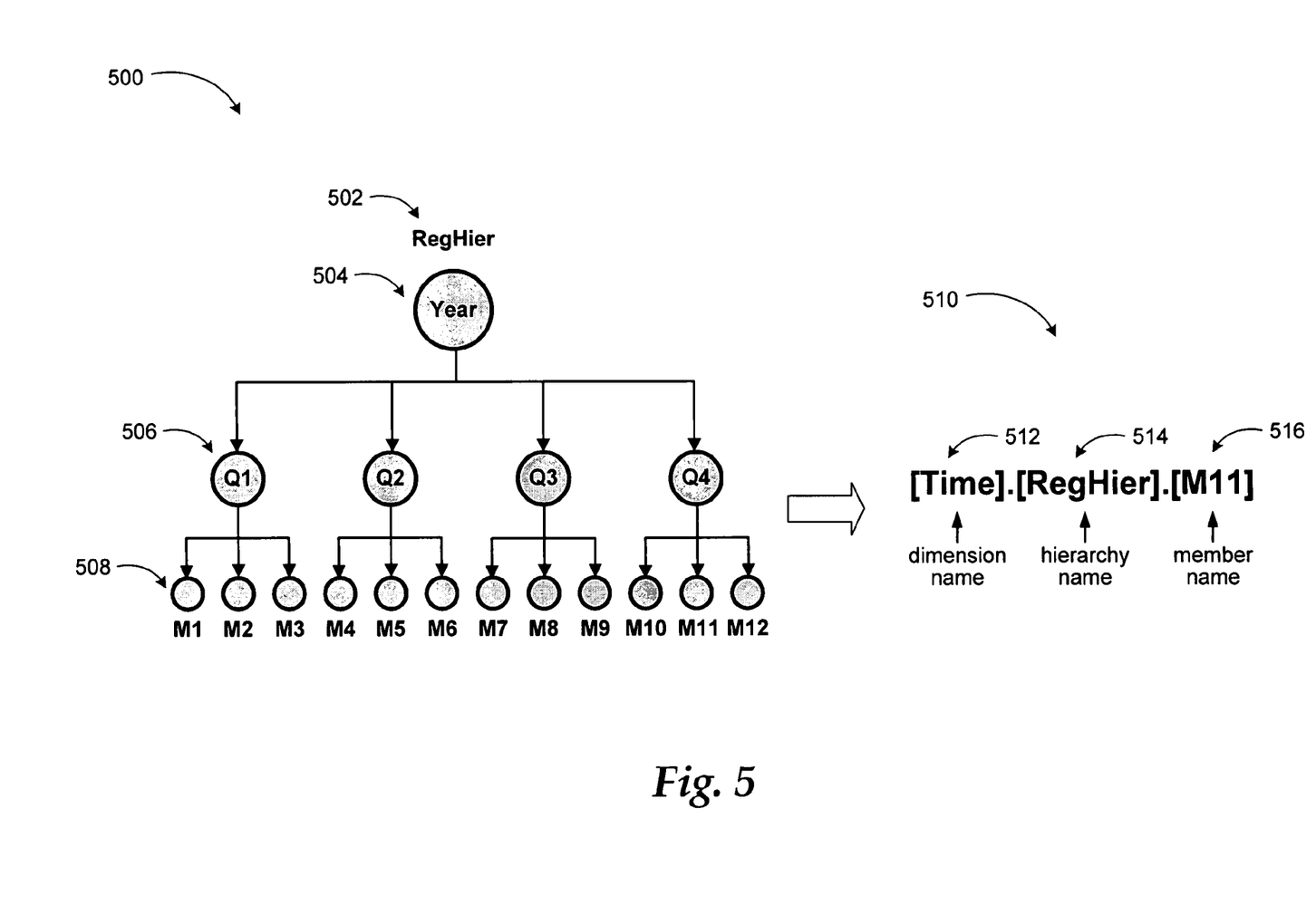
FIG. 5 illustrates an example data structure hierarchy and corresponding syntax for an allocation algorithm.

FIG. 5 illustrates an example data structure hierarchy and corresponding syntax for an allocation algorithm. As mentioned above, data may be structured in many different ways in a multi-dimensional system. Furthermore, different hierarchies may be implemented within each structure.

Data structure 500 illustrates an example hierarchy for time. Time may be one of the dimensions in a multi-dimensional data structure. There are a variety of ways to set up a hierarchy for time. For example, top-level "year" may be divided into twelve "months", each of which may in return be divided into four "weeks". Another hierarchy may include biweekly periods reporting directly to the top-level "year". Each of the hierarchies may be given a name to designate the hierarchy in the allocation algorithm.

Data structure 500 shows hierarchy 502 named "RegHier". "RegHier" begins with "Year" at top-level (504). Next, four quarters, "Q1"-"Q4", report at level 506 to "Year". Each quarter is divided to four months, "M1"-"M12" at level 508.

Syntax 510 is an example representation of data structure 500 in an allocation algorithm such as the example algorithms of FIG. 6 below. First term in syntax 510 is dimension name (512), followed by hierarchy name (514), and member name (516). For the eleventh month of example hierarchy "RegHier" of data structure 500, dimension name 512 is "Time"; hierarchy name 514 is "RegHier"; and member name 516 is "M11".

The invention is not limited to the data structures, data types, hierarchies, naming conventions, and the like, discussed above. Other data structures, data types, hierarchies, naming conventions, and the like may be implemented using the principles described herein.

Figure 6:
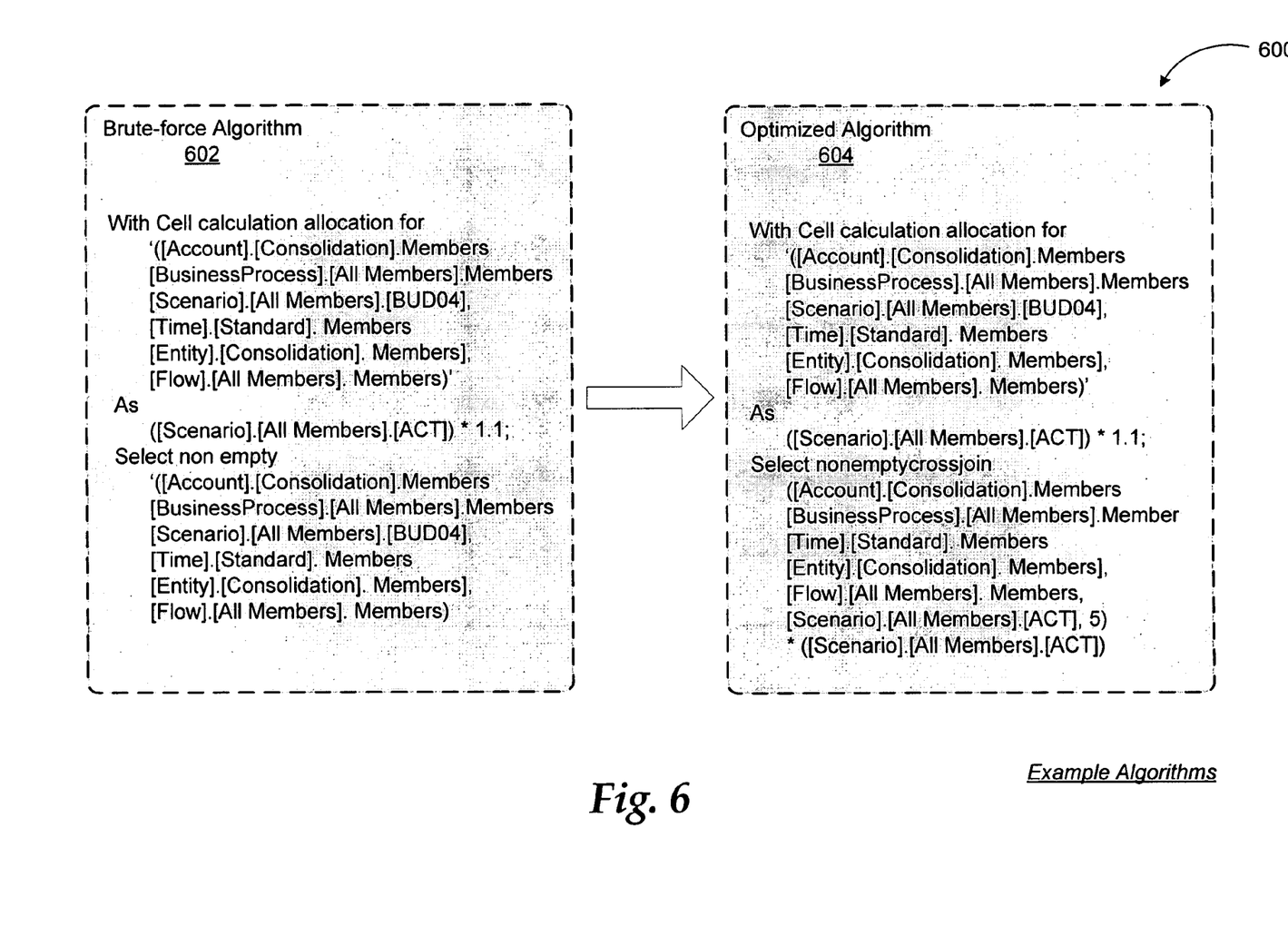
FIG. 6 illustrates an example brute-force algorithm for performing allocation in sparse data space and a corresponding query optimized algorithm.

FIG. 6 illustrates an example brute-force algorithm for performing allocation in sparse data space and a corresponding query optimized algorithm. Example algorithms 610 and 620 perform calculations for a business application using dimensions such as time, entity, and account.

In the example allocation of algorithm 610 of diagram 600, the query is performed over a large region using calculation expression:

([Scenario].[All Members].[ACT])*1.1.

To minimize calculation operations, a brut-force non-empty selection operation is performed during the calculation, but the selection process itself uses a large amount of resources. Thus, the selection process may be resource-inefficient, slow, even result in an out-of-memory error.

The example allocation of algorithm 610 may be optimized as shown in algorithm 620. Because "NonEmptyCrossjoin" is used instead of "non empty", the calculation space is reduced from the initial, relatively large definition space resulting in significantly improved performance.

Figure 7:
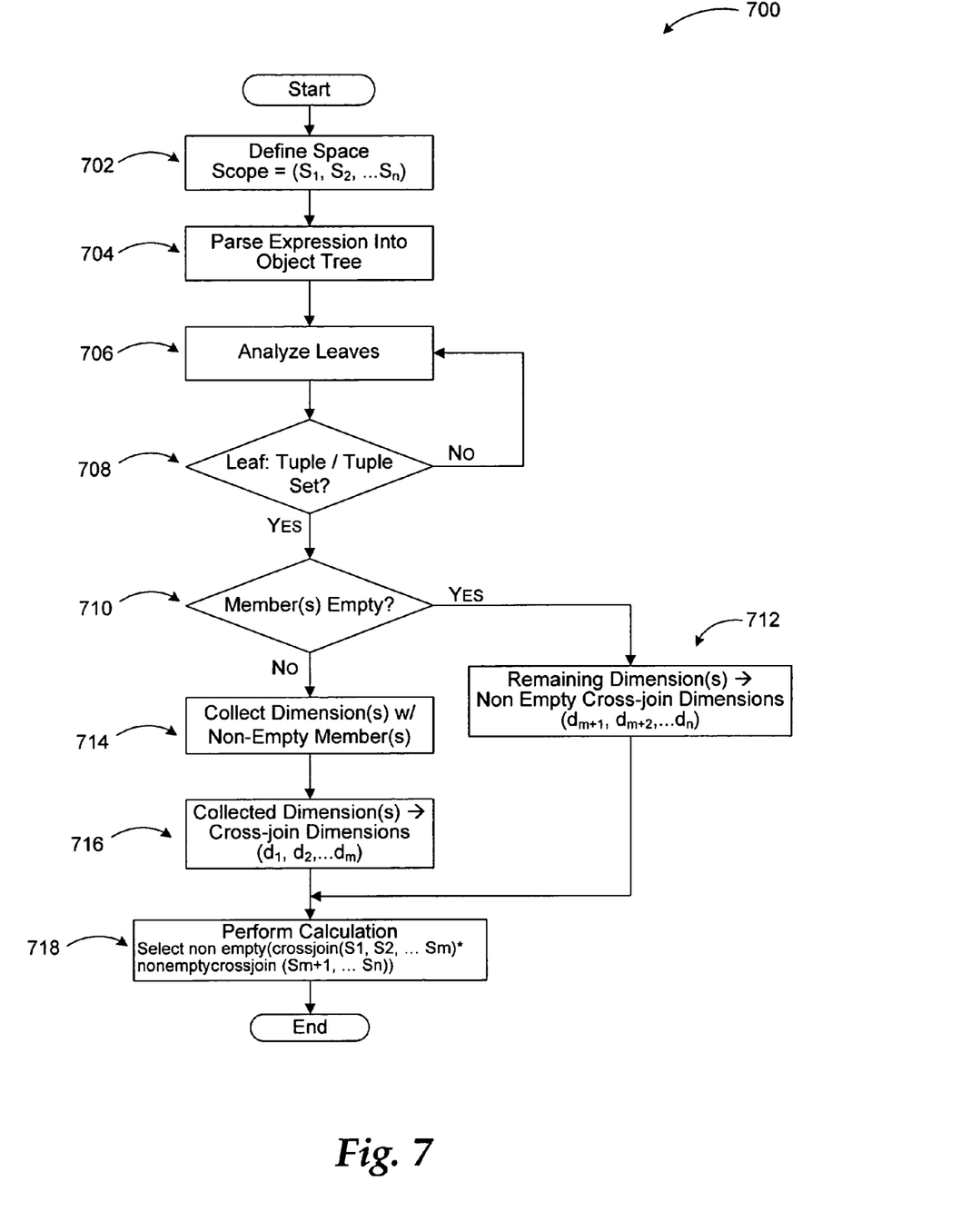
FIG. 7 illustrates a logic flow diagram for a process of performing allocation in a sparse data space by optimizing a query.

FIG. 7 illustrates a logic flow diagram for process 700 of performing allocation in a sparse data space.

Process 700 is generally directed to identifying "non-empty" tuples of a calculated scope with the non-empty tuples of a fact table. Non-empty tuples of the fact table are obtained employing a NonEmptyCrossjoin function. The NonEmptyCrossjoin function returns the cross product of two or more sets as a set, excluding empty tuples or tuples without data supplied by underlying fact tables. Once the non-empty tuples of the calculated region are determined, the tuples are expanded to cells by forming a cross-join with the missing dimensions.

Process 700 begins at operation 702, where a data space for the allocation is defined. This may be done by defining a scope of a member set such as $(S_1, S_2, \ldots S_n)$, where $S_i$ is a member of the ith dimension. Processing moves from operation 702 to operation 704.

At operation 704, the calculation expression is symbolically analyzed. This may be accomplished by parsing the expression into an object tree (e.g. a binary tree), where the leaves of the tree correspond to constants, tuples or tuple sets. Processing advances from operation 704 to operation 706.

At operation 706, the leaves of the object tree are analyzed. Each leaf term is examined for its type. Processing moves from operation 706 to decision operation 708.

At decision operation 708, a determination is made whether the leaf term being analyzed is a tuple or a tuple set. If the leaf is a tuple or tuple set, processing advances to decision operation 710. Otherwise, processing moves back to operation 706 for analysis of another leaf term.

A decision operation 710, a determination is made whether there are any dimensions for the tuple or tuple set leaf with an empty member or member set expression. If there are dimensions with an empty member of member set expression, processing proceeds to operation 712. Otherwise, processing moves to operation 714.

At operation 714, the dimensions with a non-empty member or a member set expression are collected. Processing then advances to operation 716, where the collected dimensions are designated as cross-join dimensions $(d_1, d_2, \ldots d_m)$.

The remaining dimensions are designated as non-empty cross-join dimensions $(d_{m+1}, d_{m+2}, \ldots d_n)$ at operation 712. Processing proceeds from both operations 712 and 716 to operation 718.

At operation 718, the calculation is performed using the expression of operation 704. While the calculation is being performed, a selection is made based on the combination of non-empty cross-join dimensions. In one embodiment, selecting the dimensions and their members may include creating an outline of the dimensions and their members in a desired order. By employing the NonEmptyCrossjoin function to reduce the definition space, the calculation is limited to a smaller calculation space without spending resources on selecting non-empty members in the sparse definition space first. Hence, the allocation performance is significantly enhanced. After operation 718, processing moves to a calling process for further actions.

The operations included in process 700 are for illustration purposes. Improving allocation performance by query optimization may be implemented by a similar process with fewer or additional steps, as well as in different order of operations.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for improving a performance of an allocation by query optimization, comprising:
   receiving a first query that specifies:
      a calculation target expression that specifies a set of calculation target cells that consists of all cells in a multidimensional dataset (MDDS) that are associated with a member of each non-calculation dimension of the MDDS that is in a set of members and is associated with a calculation target member in a calculation dimension of the MDDS, wherein the set of calculation target cells is dividable into:
a set of non-empty calculation target cells that consists of each non-empty cell in the set of calculation target cells; and
a set of empty calculation target cells that consists of each empty cell in the set of calculation target cells;
a calculation expression that specifies that values in the set of calculation target cells are to be calculated from values in a set of calculation source cells that consists of all cells in the MDDS that are associated with a member of each non-calculation dimension of the MDDS that is in the set of members and is associated with a calculation source member in the calculation dimension of the MDDS; and
a first selection expression that specifies a selected set of cells in the MDDS by specifying that the selected set of cells is derivable by finding non-empty cells in the set of calculation target cells;
in response to receiving the first query, symbolically analyzing the calculation expression to identify the calculation source member;
after symbolically analyzing the calculation expression, using the first query and the identified calculation source member to generate a second query that specifies:
the calculation target expression;
the calculation expression; and
a second selection expression that specifies the selected set of cells in the MDDS by specifying that the set of non-empty calculation target cells is derivable by computing a cross join of:
a non-empty cross join of the members in the set of members; and
the calculation target member;
executing the second query to obtain values in the selected set of cells by:
computing the non-empty cross join of the members in the set of members, thereby computing a first set of tuples that identify cells in the MDDS;
wherein each tuple in the first set of tuples specifies a member in the set of members of each of the non-calculation dimensions; and
wherein no cell indicated by a tuple in the first set of tuples is empty;
computing the cross join of the first set of tuples and the calculation target member, thereby computing a second set of tuples that identify all cells in the set of non-empty calculation target cells;
using the calculation expression to calculate values in the set of non-empty calculation target cells, thereby obtaining the values in the selected set of cells; and
after obtaining the values in the selected set of cells, returning the values in the selected set of cells.

2. The computer-implemented method of claim 1, wherein symbolically analyzing the calculation expression includes parsing the calculation expression into an object tree.

3. The computer-implemented method of claim 2, wherein leaves of the object tree correspond to at least one of a constant, a tuple, and a tuple set.

4. The computer-implemented method of claim 2, wherein symbolically analyzing the calculation expression further includes identifying the calculation dimension as a dimension of the MDDS indicated by a leaf of the object tree that corresponds to one of:
a tuple that specifies the dimension and a tuple set that specifies the dimension.

5. The computer-implemented method of claim 4, wherein symbolically analyzing the calculation expression further includes designating dimensions of the MDDS other than the calculation dimension as the non-calculation dimensions.

6. The computer-implemented method of claim 1, wherein using the first query and the identified calculation source member to generate the second query comprises generating the second query such that the second selection expression specifies that the set of non-empty calculation target cells is derivable by computing a cross join of:
a result of invoking a NonEmptyCrossjoin function on the members in the set of members; and
the calculation target member.

7. The computer-implemented method of claim 5, wherein designating dimensions other than the calculation dimension as the non-calculation dimensions includes creating an outline of the non-calculation dimensions and their members in a desired order.

8. The computer-implemented method of claim 1, wherein using the first query and the identified calculation source member to generate the second query comprises generating the second query such that the second query conforms to a Multi-Dimensional eXpression (MDX) standard.

9. A computer-readable storage medium having computer instructions for an allocation in a multi-dimensional business application, the instructions causing a computer that executes the instructions to:
receive a first query that specifies:
a calculation target expression that specifies a set of calculation target cells that consists of all cells in a multidimensional dataset (MDDS) that are associated with a member of each non-calculation dimension of the MDDS that is in a set of members and is associated with a calculation target member in a calculation dimension of the MDDS,
wherein the set of calculation target cells is dividable into:
a set of non-empty calculation target cells that consists of each non-empty cell in the set of calculation target cells; and
a set of empty calculation target cells that consists of each empty cell in the set of calculation target cells;
a calculation expression that specifies that values in the set of calculation target cells are to be calculated from values in a set of calculation source cells that consists of all cells in the MDDS that are associated with a member of each non-calculation dimension of the MDDS that is in the set of members and is associated with a calculation source member in the calculation dimension of the MDDS; and
a first selection expression that specifies a selected set of cells in the MDDS by specifying that the selected set of cells is derivable by finding non-empty cells in the set of calculation target cells;
symbolically analyze the calculation expression to identify the calculation source member in response to receiving the first query;
after symbolically analyzing the calculation expression, use the first query and the identified calculation source member to generate a second query that specifies:
the calculation target expression;
the calculation expression; and
a second selection expression that specifies the selected set of cells in the MDDS by specifying that the set of non-empty calculation target cells is derivable by computing a cross join of:
a non-empty cross join of the members in the set of members; and
the calculation target member;

execute the second query to obtain values of the selected set of cells by:
  computing the non-empty cross join of the members in the set of members, thereby computing a first set of tuples that identify cells in the MDDS;
    wherein each tuple in the first set of tuples specifies a member in the set of members of each of the non-calculation dimensions; and
    wherein no cell indicated by a tuple in the first set of tuples is empty;
  computing the cross join of the first set of tuples and the calculation target member, thereby computing a second set of tuples that identify all cells in the set of non-empty calculation target cells;
  using the calculation expression to calculate values in the set of non-empty calculation target cells; and
  returning the calculated values in the set of non-empty calculation target cells as the values of the selected set of cells.

10. The computer-readable storage medium of claim 9, wherein the instructions that cause the computer to use the first query and the identified calculation source member to generate the second query cause the computer to generate the second query such that the second selection expression specifies that the set of non-empty calculation target cells is derivable by computing a cross join of:
  a result of invoking a NonEmptyCrossjoin function on the members in the set of members; and
  the identified calculation target member.

11. The computer-readable storage medium of claim 9, wherein the allocation is at least one of: a planning allocation, a budgeting allocation, and an allocation that forecasts a scenario in the business application.

12. The computer-readable storage medium of claim 9, wherein the set of calculation target cells is a sparse data space, and the selected set of cells form a dense calculation space.

13. The computer-readable storage medium of claim 9, wherein the first query conforms to a Multi-Dimensional eXpression (MDX) standard.

14. The computer-readable storage medium of claim 9, wherein the instructions that cause the computer to symbolically analyze the calculation expression cause the computer to parse the calculation expression into a binary object tree.

15. A system for performing an allocation in a multi-dimensional dataset (MDDS), the system comprising:
  a database configured to store a MDDS, wherein the MDDS includes data to be used for the allocation;
  a processor configured to:
    receive a first query that conforms to a Multi-Dimensional eXpression (MDX) standard, the first query specifying:
      a "WITH" clause that includes a calculation target expression that specifies a set of calculation target cells that consists of all cells in a MDDS that are associated with a member of each non-calculation dimension of the MDDS that is in a set of members and is associated with a calculation target member in a calculation dimension of the MDDS,
        wherein the set of calculation target cells is dividable into:
          a set of non-empty calculation target cells that consists of each non-empty cell in the set of calculation target cells; and
          a set of empty calculation target cells that consists of each empty cell in the set of calculation target cells;
      an "AS" clause that includes a calculation expression that specifies that values in the set of calculation target cells are to be calculated from values in a set of calculation source cells that consists of all cells in the MDDS that are associated with a member of each non-calculation dimension of the MDDS that is in the set of members and is associated with a calculation source member in the calculation dimension of the MDDS; and
      a "SELECT" clause that includes a first selection expression that specifies a selected set of cells in the MDDS by specifying that the selected set of cells is derivable by finding non-empty cells in the set of calculation target cells;
    symbolically analyze the calculation expression to identify the calculation source member in response to receiving the first query;
    after symbolically analyzing the calculation expression, use the first query and the identified calculation source member to generate a second query that conforms to the MDX standard, the second query specifying:
      a "WITH" clause that includes the calculation target expression;
      an "AS" clause that includes the calculation expression; and
      a "SELECT" clause that includes a second selection expression that specifies the selected set of cells by specifying that the set of non-empty calculation target cells is derivable by computing a cross join of:
        a non-empty cross join of the members in the set of members; and
        the calculation target member;
    execute the second query by:
      computing the non-empty cross join of the members in the set of members, thereby computing a first set of tuples that identify cells in the MDDS,
        wherein each tuple in the first set of tuples specifies a member in the set of members of each of the non-calculation dimensions; and
        wherein no cell indicated by a tuple in the first set of tuples is empty; and
      computing the cross join of the first set of tuples and the calculation target member, thereby computing a second set of tuples that identify all cells in the set of non-empty calculation target cells;
      using the calculation expression to calculate values in the set of non-empty calculation target cells; and
      returning the calculated values in the set of non-empty calculation target cells.

16. The system of claim 15, wherein the processor is further configured to symbolically analyze the calculation expression by:
  parsing the calculation expression into an object tree, identifying the calculation dimension as a dimension of the MDDS indicated by a leaf of the object tree that corresponds to one of: a tuple and a tuple set, and
  designating dimensions of the MDDS other than the calculation dimensions as the non-calculation dimensions.

17. The system of claim 15, wherein the database is further configured to store the calculated values in the set of non-empty calculation target cells.

* * * * *